US012699793B2

(12) United States Patent
Shpilyuck et al.

(10) Patent No.: US 12,699,793 B2
(45) Date of Patent: Aug. 4, 2026

(54) ENFORCEMENT OF BALANCED USERS ACCESS TO SENSITIVE INFORMATION IN ORGANIZATIONS

(71) Applicant: Dell Products L.P., Round Rock, TX (US)

(72) Inventors: Boris Shpilyuck, Ashdod (IL); Nisan Haimov, Beer-Sheva (IL); Igor Dubrovsky, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 18/785,929

(22) Filed: Jul. 26, 2024

(65) Prior Publication Data

US 2026/0030375 A1     Jan. 29, 2026

(51) Int. Cl.
*G06F 21/62*          (2013.01)
*G06F 21/60*          (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 9,785,782 B2 * | 10/2017 | Bulumulla | ............... | G06F 21/00 |
| 10,140,438 B2 * | 11/2018 | Da Luz | ................... | G06F 21/45 |

| | | | | |
|---|---|---|---|---|
| 10,225,325 B2 * | 3/2019 | Schincariol | ......... | H04L 41/0806 |
| 10,282,557 B1 * | 5/2019 | Pore | .................... | H04L 63/1425 |
| 10,992,657 B1 * | 4/2021 | Stevens | ................ | H04L 63/102 |
| 11,233,794 B2 * | 1/2022 | Shankar | ................. | H04L 63/10 |
| 11,343,165 B1 * | 5/2022 | Mostov | .............. | H04L 43/0805 |
| 11,368,403 B2 * | 6/2022 | Chhabra | ............. | G06F 21/6218 |
| 11,562,082 B2 * | 1/2023 | Ghiold | .................... | G06F 21/31 |
| 11,983,283 B2 * | 5/2024 | Ghiold | ................. | G06F 21/604 |
| 12,095,676 B1 * | 9/2024 | Olatunji | .................. | H04L 9/50 |
| 2008/0120302 A1 * | 5/2008 | Thompson | .......... | G06F 21/6209 |
| | | | | 707/999.009 |
| 2012/0246695 A1 * | 9/2012 | Cameron | ............ | G06F 21/6236 |
| | | | | 726/1 |
| 2019/0014102 A1 * | 1/2019 | Mathew | ................. | G06F 21/41 |
| 2021/0241137 A1 * | 8/2021 | Jain | ........................ | G16H 20/30 |
| 2022/0368651 A1 * | 11/2022 | Luu | ....................... | H04L 47/788 |
| 2022/0385668 A1 * | 12/2022 | Simonetti | .............. | H04L 63/20 |
| 2023/0028708 A1 * | 1/2023 | Basel | ..................... | G06N 20/00 |
| 2023/0094856 A1 * | 3/2023 | Ithal | ...................... | H04L 63/102 |
| | | | | 726/4 |

(Continued)

*Primary Examiner* — Gary S Gracia
(74) *Attorney, Agent, or Firm* — Fogarty LLP

(57)          ABSTRACT

A method for managing user access to information in a computer system comprises associating an Accessibility Weight (AW) with computer system resources, calculating an access amount for each user by aggregating AWs for each system resource available to the user, calculating a total accessibility weight in the system by aggregating the AWs for all system resources, calculating an access percentage for each user, identifying an access baseline for one or more access ranges in the computer system, and determining, by an identity and access management system, whether a user provisioning action would violate the defined access baseline. The resources may be accessed via an API.

19 Claims, 4 Drawing Sheets

400

401 — DEFINE AN ORGANIZATION-WIDE BASELINE POLICY

402 — ASSOCIATE A METRIC CALLED ACCESSIBILITY WEIGHT WITH PROTECTED RESOURCES

403 — CALCULATE AN AMOUNT OF ACCESS FOR EACH USER BASED ON THE ACCESSIBILITY WEIGHT METRIC BY AGGREGATING ACCESSIBILITY WEIGHTS

404 — DETERMINING A TOTAL ACCESSIBILITY WEIGHT IN THE SYSTEM BY AGGREGATING ALL THE ACCESSIBILITY WEIGHTS IN THE SYSTEM

405 — CALCULATE A PERCENTAGE OF ACCESS FOR EACH USER BY DIVIDING THE AMOUNT OF USER ACCESS BY THE TOTAL ACCESSIBILITY WEIGHT AND MULTIPLYING BY 100

406 — INITIATE AN IDENTITY AND ACCESS MANAGEMENT OPERATION, WHEREIN THE OPERATION INCLUDES CHANGES TO USERS, GROUPS, ROLES, OR PERMISSIONS

407 — ACCESSIBILITY ENFORCER COMPONENT CHECKS THAT USER PERCENTAGES FALLING INTO EACH ACCESS RANGE ARE LESS THAN OR EQUAL TO THE VALUES DEFINED BY THE BASELINE POLICY

408 — ENFORCE THE BASELINE POLICY BY THE ACCESSIBILITY ENFORCER COMPONENT

(56) References Cited

U.S. PATENT DOCUMENTS

| 2023/0186221 | A1* | 6/2023 | Qualls | G06Q 10/105 |
| | | | | 705/7.28 |
| 2023/0267199 | A1* | 8/2023 | Savion | G06F 21/554 |
| | | | | 726/23 |
| 2024/0187417 | A1* | 6/2024 | Ghiold | H04L 63/105 |
| 2025/0103392 | A1* | 3/2025 | Haridas | G06F 9/4856 |
| 2025/0106097 | A1* | 3/2025 | Shinde | H04L 41/0681 |
| 2025/0299202 | A1* | 9/2025 | Yarlagadda | G06Q 30/018 |

* cited by examiner

400

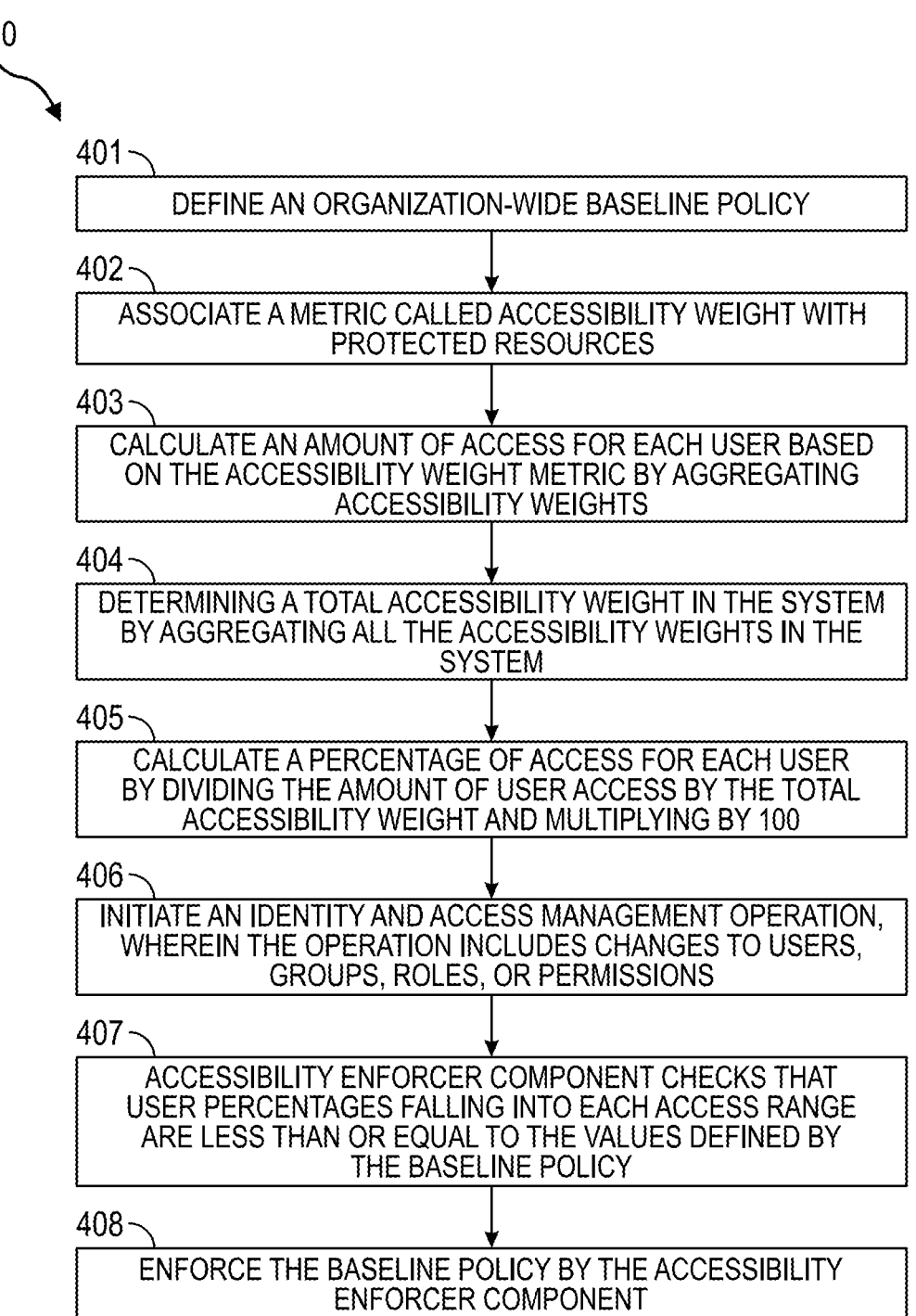

401 DEFINE AN ORGANIZATION-WIDE BASELINE POLICY

402 ASSOCIATE A METRIC CALLED ACCESSIBILITY WEIGHT WITH PROTECTED RESOURCES

403 CALCULATE AN AMOUNT OF ACCESS FOR EACH USER BASED ON THE ACCESSIBILITY WEIGHT METRIC BY AGGREGATING ACCESSIBILITY WEIGHTS

404 DETERMINING A TOTAL ACCESSIBILITY WEIGHT IN THE SYSTEM BY AGGREGATING ALL THE ACCESSIBILITY WEIGHTS IN THE SYSTEM

405 CALCULATE A PERCENTAGE OF ACCESS FOR EACH USER BY DIVIDING THE AMOUNT OF USER ACCESS BY THE TOTAL ACCESSIBILITY WEIGHT AND MULTIPLYING BY 100

406 INITIATE AN IDENTITY AND ACCESS MANAGEMENT OPERATION, WHEREIN THE OPERATION INCLUDES CHANGES TO USERS, GROUPS, ROLES, OR PERMISSIONS

407 ACCESSIBILITY ENFORCER COMPONENT CHECKS THAT USER PERCENTAGES FALLING INTO EACH ACCESS RANGE ARE LESS THAN OR EQUAL TO THE VALUES DEFINED BY THE BASELINE POLICY

408 ENFORCE THE BASELINE POLICY BY THE ACCESSIBILITY ENFORCER COMPONENT

FIG. 4

ENFORCEMENT OF BALANCED USERS ACCESS TO SENSITIVE INFORMATION IN ORGANIZATIONS

BACKGROUND

Computing devices may provide services. To provide the services, the computing devices may include hardware components and software components. The software components may store information usable to provide the services using the hardware components.

One option to process and store information is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user, or for a specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs provide users with capabilities for accessing, creating, and manipulating data. IHSs often implement a variety of security protocols in order to protect this data during such operations. A known technique for securing access to protected data that is accessed via an IHS is to segregate the protected data within an isolated software environment that operates on the IHS, where such isolated software environments may be referred to by various names, such as virtual machines, containers, dockers, etc. Various types of such segregated environments are isolated by providing varying degrees of abstraction from the underlying hardware and operating system of the IHS. These virtualized environments typically allow a user to access only data and applications that have been approved for use within that particular isolated environment. In enforcing the isolation of a virtualized environment, applications that operate within such isolated environments may have limited access to capabilities that are supported by the hardware and operating system of the IHS.

SUMMARY

Embodiments are directed to defining an organization-wide baseline policy that restricts Identity and Access Management (IAM) operations throughout the lifecycle of an enterprise computer system and assures balanced access of users to sensitive information thereby reducing the attack surface of the system. An organization-wide baseline function is defined to track users' accessibility within the system based on an Accessibility Weight metric. An Accessibility Enforcer entity enforces the users' accessibility within the system based on the organization-wide baseline function.

According to one aspect of the present invention, a method for managing user access to information in a computer system comprises associating an Accessibility Weight (AW) with computer system resources; calculating an access amount for each user by aggregating AWs for each system resource available to the user; calculating a total accessibility weight in the system by aggregating the AWs for all of the system resources; calculating an access percentage for each user; identifying an access baseline for one or more access ranges in the computer system; and determining, by an identity and access management system, automatically when a user provisioning action is requested, whether the user provisioning action would violate the defined access baseline. The resources may be accessed via an application programming interface (API).

According to another aspect, an AW value is based upon criticality or sensitivity of information exposed at a particular system resource. The resources may include one or more of: a workload, an application, a file system, storage infrastructure, a memory device, a compute resource, a virtual machine, a network connection, a security module, a workstation, an information handling system (IHS), an artificial intelligence (AI), and machine learning (ML) technology.

According to yet another aspect, the identity and access management system determines whether the user provisioning action would violate the defined access baseline by determining a current level of access for the one or more access ranges in the computer system; determining an expected level of access for the one or more access ranges in the computer system that would occur if the user provisioning action is enacted; and determining whether the expected level of access exceeds the defined access baseline in one or more access ranges.

According to another aspect, if the user provisioning action would not violate the defined access baseline, then applying the user provisioning action; and if the user provisioning action would violate the defined access baseline, then automatically rejecting the user provisioning action.

According to yet another aspect, if the user provisioning action would not violate the defined access baseline, then applying the user provisioning action; and if the user provisioning action would violate the defined access baseline, then providing a user with a current level of access before the user provisioning action is enacted and an expected level of access if the user provisioning action is enacted; and prompting the user to select whether to enact or reject the user provisioning action.

The identity and access management system may be configured to function as an Accessibility Enforcer component by evaluating whether user percentages falling into each access range are less than or equal to the access baseline.

The access baseline specifies maximal allowed percentages of users against ranges of accessibility within the computer system.

The AW for each resource corresponds to an importance of information exposed through the resource.

The user provisioning action comprises assigning a user to one or more groups, roles, permissions, or resources.

The access baseline defines lower and upper bound percentages of resource accessibility within the computer system across one or more access ranges.

The access percentage for each user may be based upon the access amount for each user and the total accessibility weight in the system.

BRIEF DESCRIPTION OF THE DRAWINGS

Figure 1:
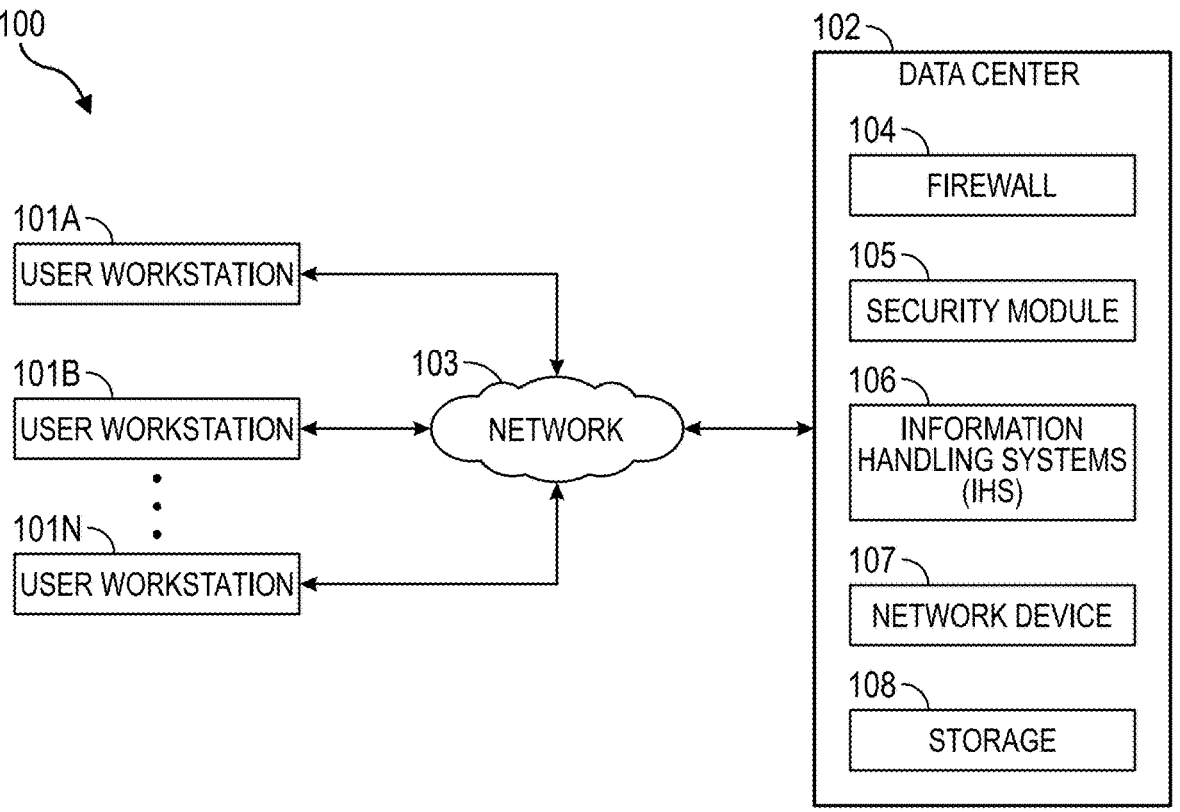

Having thus described the invention in general terms, reference will now be made to the accompanying drawings, which are not necessarily drawn to scale, and wherein:

FIG. 1 is a block diagram of an enterprise computer system in accordance with one or more embodiments.

Figure 2:
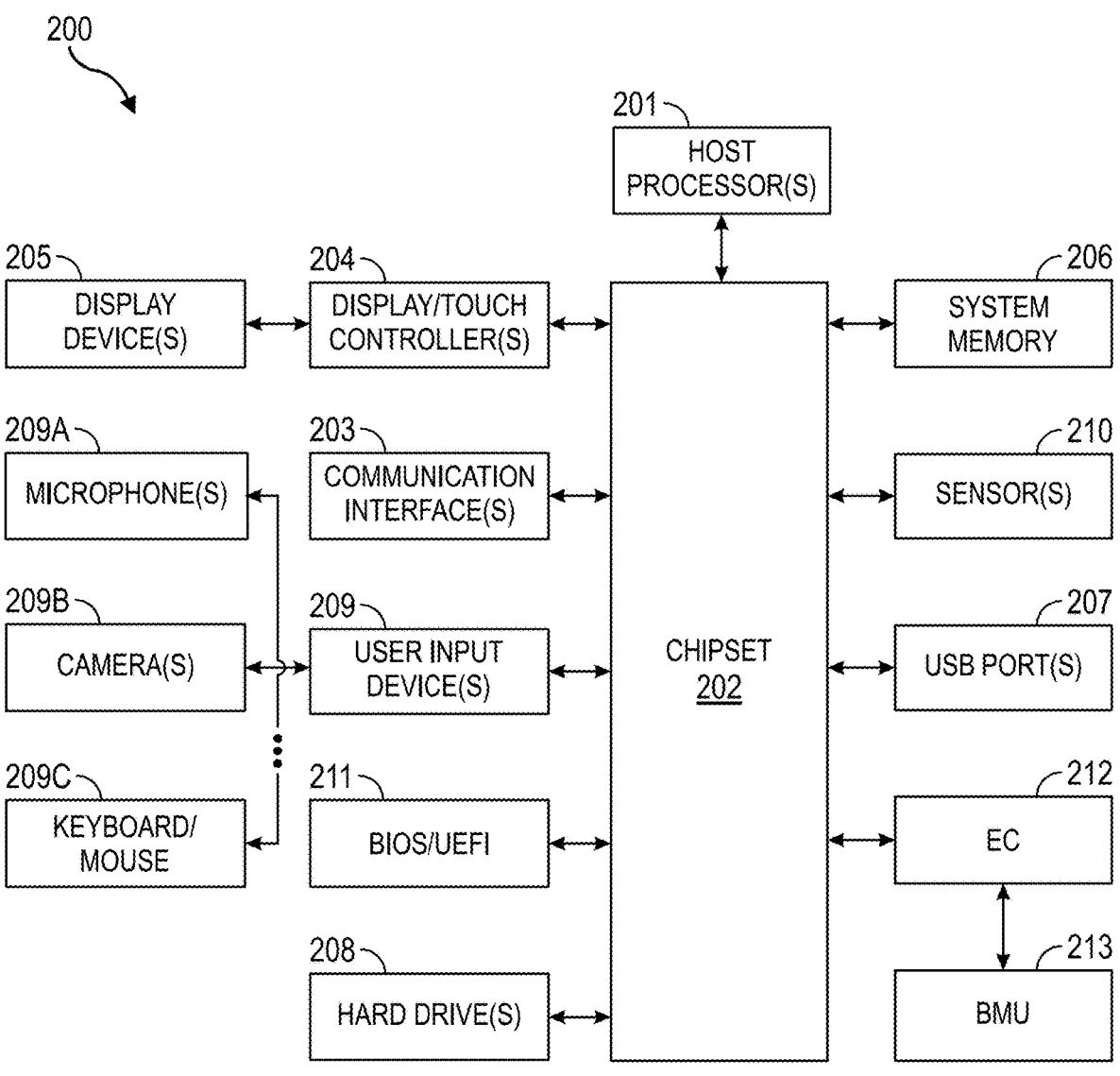

FIG. 2 shows an example of an Information Handling System (IHS) configured to implement systems and methods described herein for enforcement of balanced users access to sensitive information in organizations.

Figure 3:
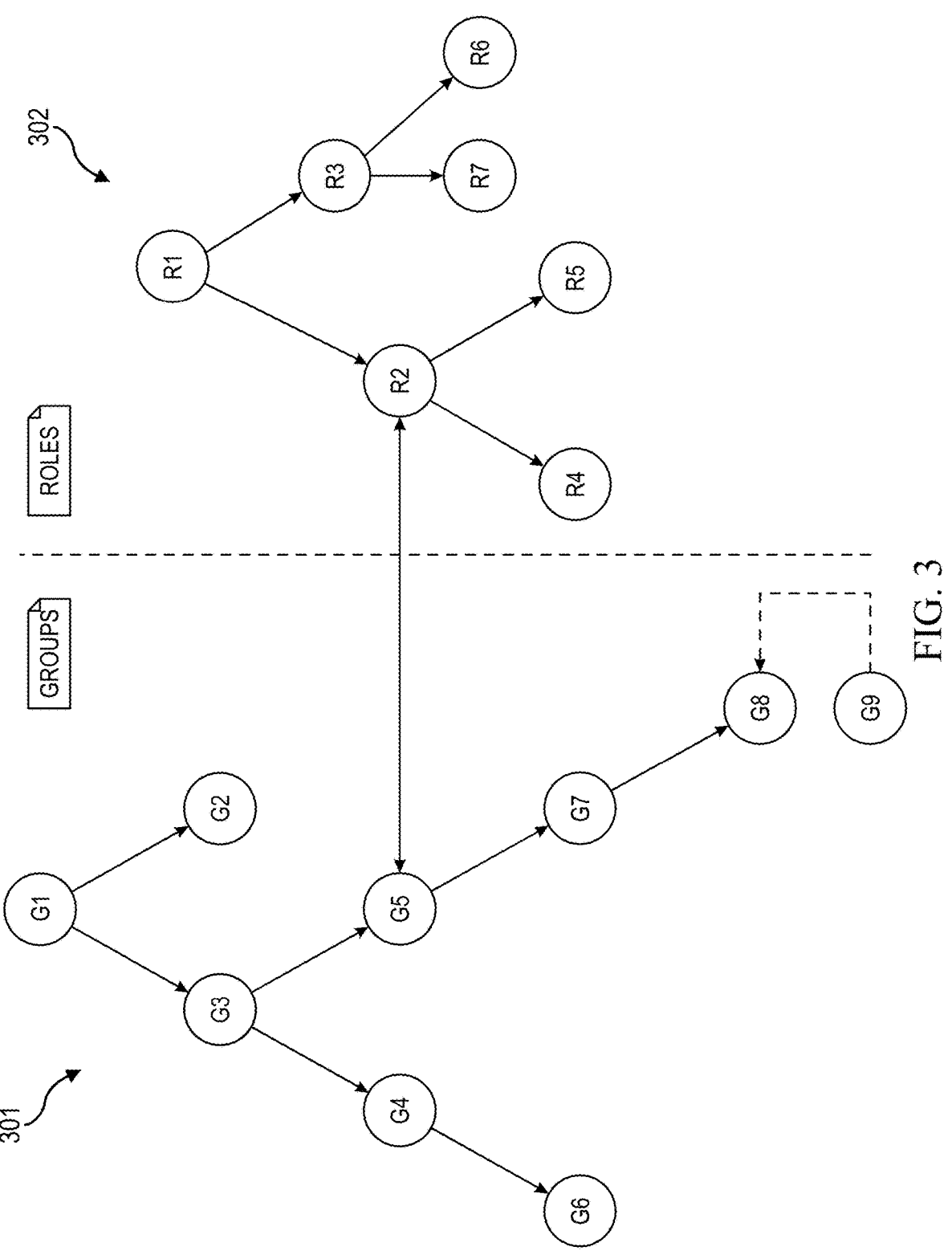

FIG. 3 illustrates a hierarchy of groups and a hierarchy of roles and their relationship within an enterprise.

FIG. 4 is flowchart illustrating a method for enforcing balanced user access to sensitive information in an organization.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In an enterprise computer system, users are typically organized into groups and are assigned roles to streamline management, enforce security, and ensure that users have appropriate access to resources. This organization is essential for maintaining an efficient and secure IT environment.

User groups are collections of users that share common characteristics or require similar access to resources. Assigning users to groups simplifies management of the computer system by allowing administrators to apply permissions and settings to multiple users at once. This enhances security by ensuring that users only have access to resources necessary for their role. Various types of groups may include, for example, functional groups that are based on job functions or departments e.g., HR, finance, marketing, IT, etc., project groups created for specific projects or initiatives which may be permanent or for the life of a particular project, and access groups that are defined by a level of access needed e.g., read-only, read-write, or administrative access.

User roles define the specific permissions and access levels that users have within the enterprise computer system. A role is usually associated with a job function or responsibility. By assigning users to particular roles, administrators can ensure that users have appropriate permissions for their responsibilities. This helps in complying with enterprise rules and regulatory requirements by controlling access to sensitive information. Roles include, for example, standard predefined roles that match common job functions e.g., user, manager, administrator, auditor, etc. and custom roles that are tailored to the specific needs of the organization and that offer more granular control over permissions.

Typically, users are assigned to groups and roles as part of an onboarding process. When a new employee joins the enterprise, they are provisioned into the system with a basic user account. Based on the user's job function, they are added to relevant functional or project groups. Users are then assigned roles that grant them the necessary permissions to perform their job. As part of ongoing network management, system administrators may use role-based access control RBAC to ensure that users only access what they need by assigning and managing roles. Administrators may also use group policies to enforce security settings, software installations, and other configurations. Preferably, regular audits and reviews are conducted to ensure users' roles and group memberships are up-to-date; however, it can be difficult to track the full scope of permissions granted to a particular user when the groups and/or roles take on a hierarchical structure wherein assignment to one group or role results in permissions for related groups or roles.

Enterprise computer systems use various technologies and tools to manage user groups and roles. Active Directory AD is a common tool used for managing users, groups, and roles in many organizations. AD allows administrators to create organizational units, define group policies, and manage access control. Identity and Access Management (IAM) systems include tools such as Okta, Azure AD, and AWS IAM that provide advanced features for managing user identities and access across multiple systems and applications. Enterprise Resource Planning ERP systems such as SAP and Oracle ERP often include user and role management functionalities to control access to business processes and data.

By organizing users into groups and assigning roles, enterprises can manage user access efficiently, enhance security, and ensure compliance with regulatory requirements. Certain "best practices" can improve the management of groups and roles. The least privilege principle is directed to limiting users to only the minimum level of access necessary for their job functions. Regular audits and periodic reviews of user access and roles help identify and mitigate potential security risks. Automated provisioning using automation tools can streamline user onboarding and offboarding process.

In an enterprise that could have thousands of users assigned to hundreds of groups and dozens of roles it is difficult to manage permissions granted to each user. In a hierarchy, the groups and roles can be recursive so that assignment to one group or role may result in a user being unexpectedly granted permission in other groups or roles. This can result in users receiving excessive access to enterprise resources. Due to the scope of resources available in an enterprise, it is beyond the capabilities of individual system administrators to track each user's permissions and access to resources. Additionally, because resources are accessed using APIs, such electronic connections cannot be tracked by individual system administrators. As a result, IAM systems or other automated systems are needed to monitor role-based access to users.

FIG. 1 is a block diagram of an enterprise computer system 100 in accordance with one or more embodiments. System 100 includes one or more user workstations 101A-N, a data center 102, and a network 103. System 100 may include additional, fewer, and/or different components without departing from the scope of the invention. Each component may be operably connected to any of the other components via any combination of wired and/or wireless connections.

In one or more embodiments, the user workstations 101A-N, data center 102, and network 103 may be physical or logical devices, as discussed below. Each user workstation 101A-N may be operably connected to data center 102 via the network 103 in which the network 103 may allow each user workstation 101A-N and its associated hardware and software components to communicate with data center 102 (e.g., to communicate with the components of data center 102). In one or more embodiments, a firewall 104, a security module 105, one or more Information Handling Systems (IHS) 106, a network device 107, and one or more storage devices 108 are deployed in data center 102 and may collectively be referred to as "components of data center 102."

While FIG. 1 illustrates a specific configuration of the system 100, other configurations may be used without departing from the scope of the invention. For example, although user workstation 101A-N and data center 102 are shown to be operatively connected through the network 103, user workstation 101A-N and data center 102 may be directly connected (i.e., without an intervening network 103). Further, the functioning of the user workstations 101A-N and data center 102 is not dependent upon the functioning and/or existence of the other components (e.g., devices in the system 100). Rather, the user workstations 101A-N and data center 102 may function independently and perform operations locally that do not require communication with other components. Accordingly, embodiments disclosed herein should not be limited to the configuration of components shown in FIG. 1.

In one or more embodiments, one or more IHS 106 may be a physical computing device or a logical computing device (e.g., a virtual machine (VM)) that may be configured to host and maintain various workloads and/or to provide a computing environment (e.g., computing power and storage whercon workloads may be implemented). In general, data center 102 provides a network of computing and storage resources that enable the delivery of shared applications and data. For example, data center 102 of an enterprise may exchange data with other data centers of the same enterprise that are registered in network 103 in order to participate in a collaborative workload placement. As yet another example, data center 102 may split up a request (e.g., an operation, task, activity, etc.) with another data center and coordinate its efforts to complete the request (e.g., to generate a response more efficiently than if data center 102 had been responsible for completing the request on its own). One of ordinary skill will appreciate that data center 102 may perform other functionalities without departing from the scope of the invention.

User workstations 101A-N may be implemented as a computing device, such as an IHS, a mobile phone, a tablet computer, a laptop computer, a desktop computer, a server, a distributed computing system, or a cloud resource. The computing device may include one or more processors, memory (e.g., random access memory RAM), and persistent storage (e.g., disk drives, solid-state drives SSDs, etc.). The computing device may include instructions, stored in the persistent storage, that when executed by the processor s of the computing device cause the computing device to perform the functionality of various applications for word processing, data management, communications, etc. and/or to execute client applications for accessing data center 102 and functionalities and services hosted by data center 102.

In one or more embodiments, data center 102 may be capable of providing the aforementioned functionalities and services to the user of the user workstations 101A-N. However, not all users may be allowed to receive all of the services available via data center 102. For example, the priority (e.g., the user access level) of a user may be used to determine how to manage computing resources within data center 102 to provide services to that user. As yet another example, the priority of a user may be used to identify the services that need to be provide to that user. As yet another example, the priority of a user may be used to determine how quickly communications for the purposes of providing services in cooperation with the network 103 and its subcomponents are to be processed by the network 103.

For example, a user may be assigned an access level that indicates that certain ports of network 103 are to be opened and other ports are to be blocked for a user on a workstation 101A-N. This allows for certain services to be provided to the user by data center 102 and for network traffic from that user workstation 101A-N to be afforded a certain level of quality (e.g., a certain priority and processing rate).

In one or more embodiments, data center 102 may include but not be limited to, for example, routers, switches, firewalls, security modules, memory/storage infrastructure, servers, an application-delivery controller, network device, etc. Data center 102 may support business applications and activities such as email, asset sharing, production workload, customer relationship management, enterprise resource planning, artificial intelligence (AI)/machine learning (ML)-based activities, virtual desktop infrastructure (VDI) environments, collaboration services, etc.

In one or more embodiments, the components described above of data center 102 provide network infrastructure that connects servers (physical and/or virtualized), data center services, storage, and external connectivity to end-user locations (e.g., user workstations 101A-N), storage infrastructure (e.g., Storage Area Network (SAN) infrastructure) 108, and computing resources (e.g., processing, memory, local storage, network connectivity, etc.) that drive applications.

In one or more embodiments, data center 102 may be a part of a business operation region (BOR) of an organization in which the BOR corresponds to a geographic region (e.g., a city, a county, a state, a province, a country, a country grouping e.g., the European Union, etc.). For example, data center 102 of a particular organization may be located in the United States and another data center (not shown) of the organization may be located in Europe for an organization that has multiple geographically distributed data centers around the world.

In some embodiments, firewall 104 is a network monitoring/security component that monitors all incoming and outgoing network traffic (e.g., requests, responses, calls, etc.) and decides whether to allow or block specific network traffic based on a defined set of security rules. Firewall 104 may be, for example but not limited to: a hardware component, a software component, a software as-a-service SaaS, a private cloud, etc. Firewall 104 may include functionality to monitor (e.g., track network traffic in) network 103 to obtain a dataset. In one or more embodiments, the dataset may include, for example but not limited to: a request (e.g., an application programming interface (API) call, a type of a request (e.g., a "get" request, a "delete" request, an "update" request, a "post" request, etc.), a response to a request (e.g., a response to an API call), corresponding response time for a request, a list of application data that is being used (e.g., obtained, updated, etc.) by an API, a list of operations that are being done on application data, a period of time within which application data is being used by an API, etc.

As used herein, an "API" represents a collection of methods and procedures e.g., retrieving information about an API source, updating the API source, etc. that define how applications or computing devices can connect to and communicate with each other. The collection of methods and procedures may be designed and configured to facilitate a computing device's connection (e.g., access to one another). In general, the computing device performing the accessing is called "the client", and the computing device containing a resource is called "the server".

As used herein, an "API call" may refer to a process of an application or a computing device submitting a request to an API. The API call allows applications to access data and/or functionality from backend services and to retrieve requested data from an external application or an external computing device. In some embodiments, a request and a response to that request may be communicated over the network 103. In some embodiments, corresponding response time for a request may be a period of time (with a definite start and end) within which a response process is set to be completed. Firewall 104 may periodically obtain the dataset from the network traffic. The firewall 104 may also obtain the dataset from the network traffic in real-time.

Firewall 104 may monitor network traffic to determine, for example, availability of network 103, unusual activities (e.g., exploitation events on network 103). Generally, an unusual activity on network 103 may be a sign of a security issue, such as a malicious attack, distributed denial of service DDOS attack, malware attack, etc. Upon identifying unusual activity, firewall 104 may notify an administrator (e.g., a network service provider (NSP) of network 103). Based on receiving the notification from the firewall 104, the NSP of network 103 may reconfigure the network 103 to fix the security issue.

Firewall 104 may detect latency (e.g., delays in network 103) due to increased network traffic. Because of the latency (e.g., the time it takes for data packets to be transmitted, stored, or retrieved), firewall 104 may also notify the NSP of a Quality of Service (QOS) for the network connection. Based on notifications from firewall 104, the NSP may reconfigure the network 103 to minimize the latency. Firewall 104 may detect latency in the network traffic because of, not limited to, an increased amount of requests, an increased amount of responses, an increase in a size of a request, an increase in a size of a response, etc. One of ordinary skill will appreciate that firewall 104 may perform other functionalities without departing from the scope of the invention.

The network device 107 may be any type of device, such as a switch or router, that enables computing devices to communicate with other computing devices in a network environment. Network device 107 may include functionality to use network configuration information to specify any number of configurations for a network device to provide its functionalities to determine how to provide/configure its respective services. For example, a network configuration repository may specify identifiers of services and corresponding ports for the network device 107. The repository may specify how to configure the network device 107 at any level of granularity. Network device 107 may generate a secure data retrieval path (e.g., a secure tunnel across network 103) based on a request received from security module 105. Network device 107 may perform any number and type of communications schemes, such as Internet protocol IP communications, Ethernet communications, etc. Network device 107 may limit communications on a granular level (e.g., on a per port level, on a per sending device level, etc.) via filtering or other methodology.

Network device 107 may provide compression of network traffic at any level of a network stack or at any protocol or network layer. The network device 107 may also provide transport layer protocol optimizations (e.g., transport control protocol TCP optimizations), flow control, performance, modifications and/or management to accelerate delivery of applications and data. Network device 107 may act as any type and form of transport control protocol or transport layer terminating device, such as a gateway or a firewall. For example, the network device 107 may terminate a transport control protocol by establishing a transport control protocol connection with a second network device such as a user workstation 101A-N.

Network device 107 may provide a secure (e.g., encrypted) tunnel by employing a tunneling protocol such as the generic routing encapsulation (GRE) tunneling protocol, the IP-in-IP tunneling protocol, the secure shell (SSH) tunneling protocol, the point-to-point tunneling protocol, the virtual extensible local area network (VXLAN) protocol. Network device 107 may set up efficient and secure connections between networks (e.g., a virtual private network (VPN) connection, a secure socket layer VPN (SSL VPN) connection, an IP security (IPSec) based VPN connection, a transport layer security VPN (TLS VPN) connection, etc.).

Network device 107 may include logic, functions, rules, and/or operations to perform services or functionalities for communications between, for example, data center 102 and user workstations 101A-N, such as SSL VPN connectivity, SSL offloading, switching/load balancing, hypertext transfer protocol secure (HTTPS)-encrypted connections, domain name service (DNS) resolution, and acceleration techniques (e.g., compression, decompression, TCP pooling, TCP multiplexing, TCP buffering, caching, etc.).

As used herein, networking, "tunneling" is a way for transporting data across a network 103 using protocols standardized set of rules for formatting and processing data and for enabling computing devices to communicate with one another that are not supported by that network. In general, a "secure tunnel" refers to a group of microservices that includes, for example, a user interface (UI) server service, an API server service, a controller service, a tunnel connection service, an application mapping service, etc. Tunneling works by encapsulating packets into a larger file in which the "encapsulated packet" is essentially a packet inside another packet. In an encapsulated packet, the header and payload of the first packet goes inside the payload section of the surrounding packet where the original packet itself becomes the payload.

The components of data center 102 may store and manage business-critical applications and services. Data center security is a key aspect to protect enterprise data. To achieve this, a security module 105 may be deployed with or between firewall 104 and other components of data center 102 so that business-critical data and services are not directly exposed to the network 103. One or more security modules 105 may execute independently from the firewall 104 of data center 102 and may be deployed to each data center, for example, of an organization. Security module 105 may provide global load balancing, site failover, network traffic management across an organization's data centers and public cloud provider networks, etc. In order to provide the aforementioned functionalities, each security module 105 may monitor the health, availability, and latency for each site and perform one or more policies that have been configured around regulatory requirements. Security module may also ensure multisite resiliency and disaster recovery (e.g., security module 105 may redirect network traffic to the closest or best performing data center, or to healthy data centers if there is an outage).

Storage 108 may be any device for storing data and providing access to stored data, such as SAN infrastructure, which is a specialized, high-speed network that provides high-performance and low-latency network access to storage devices. Storage 108 may include, for example, one or more hosts (e.g., a SAN metadata server, a SAN data replication server, a SAN management server, etc.), one or more switches (e.g., a Fibre Channel FC switch, an Ethernet switch, an InfiniBand switch, etc.), one or more gateways to move data between different SAN infrastructures, and one or more storage devices (e.g., redundant array of independent disks RAID, a storage pool, a virtual storage resource for access by a remotely located computing device, etc.) that are interconnected using a variety of technologies, interfaces, topologies, and protocols (e.g., FC, Internet small computer systems interface iSCSI, SCSI, nonvolatile memory express NVMe, Fibre Connection FICON, Fibre Channel over Ethernet FCOE, remote direct memory access RDMA, secure remote password SRP, etc.).

Storage infrastructure 108 may present storage devices to a host such that the storage devices appear to be locally attached. Storage device 108 may store unstructured and/or structured data that may include, for example, an identifier, an alias, a serial number, a vendor name or identifier, a model identifier, an identification of at least one capability, an identification of an available functionality, an identification of a resource provided by a storage device, a data center identifier, a storage device identifier, an access control list (ACL), a type of a data center, a size of a data center, an amount of space used in a data center, an amount of space available in a data center, information associated with redundancy features, information associated with the types of provisioning functionality availability, default configuration data of a storage device, status data of a storage device, etc.

In some embodiments, storage infrastructure 108 may provide data protection (e.g., data backup, data replication, data management, data restore, etc.) services to the user workstations 101A-N or to any other component of the system 100. The data protection services may initiate generation and storage of backups. The data protection services may also include restoration of the user workstations 101A-N or any other component of the system 100 to a restoration host not shown using the backups stored temporarily or permanently in the storage 108.

In one or more embodiments, in order to provide the above-mentioned functionalities, the storage infrastructure 108 may need to communicate with other components of data center 102 with minimum amount of latency (e.g., with high-throughput e.g., a high data transfer rate and sub-millisecond latency). For this reason, REST APIs may be used to enable communication s between the storage 108 and the other components. As used herein, a "REST API" is an interface that two computing devices use to exchange data securely over the Internet or to exchange data internally. More specifically, the term "REST" defines a set of rules and constraints not a protocol or a standard that need to be followed when building a communication path. Any computing device that adheres to those rules and constraints will be able to communicate via a set of uniform, shared, and stateless or stateful operators and requests. APIs denote the underlying code that, if it conforms to the set of rules and constraints, allows computing devices to communicate with one another. In operation, REST APIs use HTTP to communicate. More specifically, REST APIs communicate via HTTP to perform standard database functions such as, for example, creating, reading, updating, and deleting records within a resource.

In various embodiments, IHSs 106 may be configured for hosting and maintaining various workloads, providing a computing environment (e.g., computing power and storage whereon workloads may be implemented), providing computer-implemented services (e.g., receiving a request, sending a response to the request, etc. to one or more entities e.g., users, components of the system 100, etc.), and exchanging data with other components registered in the network 103. In one or more embodiments, in order to read, write, or store data, an IHS 106 may communicate with storage 108 via an FC switch described above, which is deployed between or disposed between the server and the storage infrastructure 108.

For example, an IHS 106 may split up a request with another component of the system 100 and coordinate its efforts to complete the request (e.g., to generate a response more efficiently than if the server had been responsible for completing the request). In one or more embodiments, a request may be, for example, a web browser search request, a representational state transfer REST request, a computing request, a database management request, a registration request, a file upload/download request, etc. To provide the computer-implemented services to the entities, the IHS 106 may function as a server (e.g., an enterprise server, a modular server, a blade server, a mainframe, a workstation computer, etc.) and may perform computations locally and/or remotely. By doing so, IHS 106 may utilize different computing devices that have different quantities of computing resources (e.g., processing cycles, memory, storage, etc.) to provide a consistent experience to the entities.

Network 103 may represent a computing network configured for computing resource and/or messages exchange among registered computing hosts (e.g., data center 102, user workstations 101A-N, etc.). As discussed above, components of the system 100 may operatively connect to one another through the network 103 which may be, for example, a LAN, a WAN, a mobile network, a wireless LAN WLAN, etc., In one or more embodiments, the network 103 may be implemented using any combination of wired and/or wireless network topologies, and the network 103 may be operably connected to the Internet or other networks. Further, network 103 may enable interactions between, for example, data center 102 and a user workstation 101A-N through any number and type of wired and/or wireless network protocols (e.g., TCP, UDP, Internet Protocol version 4 IPv4, etc.). Network 103 may encompass various interconnected, network-enabled subcomponents not shown (e.g., switches, routers, gateways, cables etc.) that may facilitate communications between the components of the system 100.

In one or more embodiments, user workstations 101A-N may be physical or logical computing devices configured for hosting one or more workloads and/or for providing computing environments whereon workloads may be implemented. The user workstations 101A-N may provide computing environments that are configured for workload placement collaboration, computing resource (e.g., processing, storage/memory, virtualization, networking, etc.) exchange, and protecting workloads including their applications and application data of any size and scale based on, for example, one or more Service Level Agreements (SLAs) configured by users of the user workstations 101A-N.

User workstations 101A-N may include any number of applications and/or content accessible through the applications that provide computer-implemented application services to the users. Application services may include, for example, database services, electronic communication services, instant messaging services, file storage services, web-based services, desktop-based services, workload placement collaboration services, etc. In order to provide the aforementioned application services, each application may host similar or different components. The components may be, for example, instances of databases, instances of email servers, etc. Applications may be executed on the user workstations 101A-N as instances of an application.

Further, applications may vary in different embodiments, but in certain embodiments, applications may be custom developed or commercial (e.g., off-the-shelf applications) that a user desires to execute on a user workstation 101A-N. In one or more embodiments, applications (e.g., a word processor, a media player, a web browser, a file viewer, an image editor, etc.) may be designed and configured to perform one or more functions instantiated by a user using computing resources of a user workstation 101A-N.

As used herein, "storage" refers to a hardware component that is used to store data in a user workstation 101A-N or data center 102. Storage may be a physical computer-readable medium. In most cases, storage may be configured as a storage array (e.g., a network attached storage array) in which a storage array may refer to a collection of one or more physical storage devices. Each physical storage device may include non-transitory computer-readable storage media, in which the data may be stored in whole or in part, and temporarily or permanently.

As used herein, "memory" may be any hardware component that is used to store data in a user workstation 101A-N or data center 102. The data stored may be accessed almost instantly regardless of where the data is stored in memory. The memory may provide the above-mentioned instant data access because the memory may be directly connected to a CPU on a wide and fast bus (e.g., a high-speed internal connection that transfers data among hardware components of a user workstation 101A-N).

As used herein, "communication" may refer to simple data passing, or may refer to two or more components coordinating a job. Further, as used herein, the term "data" is intended to be broad in scope. In this manner, that term embraces, for example but not limited to: data segments that are produced by data stream segmentation processes, data chunks, data blocks, atomic data, emails, objects of any type, files of any type (e.g., media files, spreadsheet files, database files, etc., contacts, directories, sub-directories, volumes, etc.).

As used herein, "computing" refers to any operations that may be performed by a computer, including but not limited to: computation, data storage, data retrieval, communications, etc. Further, as used herein, a "computing device" refers to any device in which a computing operation may be carried out. A computing device may be, for example but not limited to: a compute component, a storage component, a network device, a telecommunications component, etc.

As used herein, a "resource" refers to any program, application, document, file, asset, executable program file, desktop environment, computing environment, or other resource made available to, for example, a user of a client described below. The resource may be delivered to the client via, for example but not limited to: conventional installation, a method for streaming, a VM executing on a remote computing device, execution from a removable storage device connected to the client such as universal serial bus (USB) device, etc.

As used herein, a "workload" is a physical or logical component configured to perform certain work functions. Workloads may be instantiated and operated while consuming computing resources allocated thereto. A user may configure a data protection policy for various workload types. Examples of a workload may include but not limited to: a data protection workload, a VM, a container, a network-attached storage (NAS), a database, an application, a collection of microservices, a file system (FS), small workloads with lower priority workloads (e.g., FS host data, operating system OS data, etc.), medium workloads with higher priority (e.g., VM with FS data, network data management protocol NDMP data, etc.), large workloads with critical priority (e.g., mission critical application data, etc.).

As used herein, a "policy" is a collection of information, such as a backup policy or other data protection policy, that includes, for example but not limited to: identity of source data that is to be protected, backup schedule and retention requirements for backed up source data, identity of a service level agreement (SLA) or a rule that applies to source data, identity of a target device where source data is to be stored, etc.

As used herein, a "rule" is a guideline used by an SLA component to select a particular target device or target devices, based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor and a user may specify one or more user performance requirements that define, for example, a target device to be chosen dynamically during, and as part of, a data protection process, for example but not limited to: how many copies should be made of source data, latency requirements, data availability requirements, recovery point objective RPO requirements, recovery time objective RTO requirements, etc. In most cases, the user may be agnostic as to which particular target devices are used, as long as the user performance requirements are satisfied.

As used herein, the term "backup" is intended to be broad in scope. In this manner, example backups in connection with which embodiments of the invention may be employed include but not limited to: full backups, partial backups, clones, replications, snapshots, incremental backups, differential backups, etc.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit CPU, memory, and disk that those processes have access to.

As used herein, a "cloud" refers to servers that are accessed over the Internet and the software and databases that executes on those servers. With the help of cloud or "cloud computing", users or organizations do not need to manage physical servers themselves or execute software applications on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

Cloud computing is possible because of a technology called "virtualization". Virtualization allows for the generation of a VM that behaves as if it was a physical computing device with its own hardware components. When properly implemented, VMs on the same host are sandboxed from one another so that they do not interact with each other, and the files and/or applications from one VM are not visible to another VM even though they are on the same physical computing device.

In one or more embodiments, cloud computing environments which may or may not be public may include storage environments that may provide data protection functionality for one or more users. Cloud computing environments may also perform computer-implemented services e.g., data protection, data processing, etc. on behalf of one or more users. Some example cloud computing environments that embodiments of the invention may be employed include but not limited to: Microsoft® Azure, Amazon® AWS, Dell® Cloud Storage Services, Google® Cloud, etc.

FIG. 2 shows an example of an Information Handling System (IHS) 200 configured to implement systems and methods described herein for enforcement of balanced users access to sensitive information in organizations. IHS 200 may be used as a user workstation 101A-N or an IHS 106 (FIG. 1), for example.

FIG. 2 is a block diagram of components of IHS 200. As depicted, IHS 200 includes host processor(s) 201. In various embodiments, IHS 200 may be a single-processor system, or a multi-processor system including two or more processors. Host processor(s) 201 may include any processor capable of executing program instructions, such as an INTEL/AMD x76 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 200 includes chipset 202 coupled to host processor(s) 201. Chipset 202 may provide host processor(s) 201 with access to several resources. In some cases, chipset 202 may utilize a QuickPath Interconnect (QPI) bus to communicate with host processor(s) 201. Chipset 202 may also be coupled to communication interface(s) 203 to enable communications between IHS 200 and various wired and/or wireless networks, such as Ethernet, WiFi, BT, cellular or mobile networks (e.g., Code-Division Multiple Access or "CDMA," Time-Division Multiple Access or "TDMA," Long-Term Evolution or "LTE," etc.), satellite networks, or the like.

Communication interface(s) 203 may be used to communicate with peripheral devices (e.g., BT speakers, microphones, headsets, etc.). Moreover, communication interface(s) 203 may be coupled to chipset 202 via a Peripheral Component Interconnect Express (PCIe) bus, or the like.

Chipset 202 may be coupled to display and/or touchscreen controller(s) 204, which may include one or more Graphics Processor Units (GPUs) on a graphics bus, such as an Accelerated Graphics Port (AGP) or PCIe bus. As shown, display controller(s) 204 provide video or display signals to one or more display device(s) 205.

Display device(s) 205 may include Liquid Crystal Display (LCD), Light Emitting Diode (LED), organic LED (OLED), or other thin film display technologies. Display device(s) 205 may include a plurality of pixels arranged in a matrix, configured to display visual information, such as text, two-dimensional images, video, three-dimensional images, etc. In some cases, display device(s) 205 may be provided as a single continuous display, rather than two discrete displays.

Chipset 202 may provide host processor(s) 201 and/or display controller(s) 204 with access to system memory 206. In various embodiments, system memory 206 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 202 may also provide host processor(s) 201 with access to one or more Universal Serial Bus (USB) ports/controllers 207, to which one or more peripheral devices may be coupled (e.g., integrated or external webcams, microphones, speakers, etc.).

Chipset 202 may further provide host processor(s) 201 with access to one or more hard disk drives, solid-state drives, optical drives, or other removable-media drives 208.

Chipset 202 may also provide access to one or more user input devices 209, for example, using a super I/O controller or the like. Examples of user input devices 209 include, but are not limited to, microphone(s) 209a, camera(s) 209b, and keyboard/mouse 209c. Other user input devices 209 may include a touchpad, stylus or active pen, totem, etc. Each user input device 209 may include a respective controller (e.g., a touchpad may have its own touchpad controller) that interfaces with chipset 202 through a wired or wireless connection (e.g., via communication interfaces(s) 203).

In some cases, chipset 202 may also provide access to one or more user output devices (e.g., video projectors, paper printers, 3D printers, loudspeakers, audio headsets, Virtual/Augmented Reality (VR/AR) devices, etc.).

In certain embodiments, chipset 202 may further provide an interface for communications with one or more hardware sensors 210. Sensors 210 may be disposed on or within the chassis of IHS 200, or otherwise coupled to IHS 200, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s).

BIOS/UEFI 211 is coupled to chipset 202. UEFI was designed as a successor to BIOS, and many modern IHSs utilize UEFI in addition to or instead of a BIOS. Accordingly, BIOS/UEFI 211 is intended to also encompass a UEFI component. BIOS/UEFI 211 provides an abstraction layer that allows the OS to interface with certain hardware components that are utilized by IHS 200.

Upon booting of IHS 200, host processor(s) 201 may utilize program instructions of BIOS 211 to initialize and test hardware components coupled to IHS 200, and to load a host OS for use by IHS 200. Via the hardware abstraction layer provided by BIOS/UEFI 211, software stored in system memory 206 and executed by host processor(s) 201 can interface with I/O devices coupled to IHS 200.

Embedded Controller (EC) 212 (sometimes referred to as a Baseboard Management Controller or "BMC") includes a microcontroller unit or processing core dedicated to handling selected IHS operations not ordinarily handled by host processor(s) 201.

Examples of such operations may include, but are not limited to: power sequencing, power management, receiving and processing signals from a keyboard or touchpad, as well as other buttons and switches (e.g., power button, laptop lid switch, etc.), receiving and processing thermal measurements (e.g., performing cooling fan control, throttling CPUs and GPUs, controlling colling fan speeds, and emergency shutdown), controlling indicator Light-Emitting Diodes or "LEDs" (e.g., caps lock, scroll lock, num lock, battery, ac, power, wireless LAN, sleep, etc.), managing the battery charger and the battery, enabling remote or Out-of-Band (OOB) management, diagnostics, and remediation over network(s), and the like.

Unlike other devices in IHS 200, EC 212 may be made operational from the very start of each power reset, before other devices are fully running or powered on. As such, EC 212 may be responsible for interfacing with a power adapter to manage the power consumption of IHS 200. These operations may be utilized to determine the power status of IHS 200, such as whether IHS 200 is operating from battery power or is plugged into an AC power source. Firmware instructions utilized by EC 212 may be used to manage other core operations of IHS 200 (e.g., turbo modes, maximum operating clock frequencies of certain components, etc.).

In some cases, EC 212 may implement operations for detecting certain changes to the physical configuration or posture of IHS 200 and managing other devices in different configurations of IHS 200. For instance, when IHS 200 as a 2-in-1 laptop/tablet form factor, EC 212 may receive inputs from a lid position or hinge angle sensor 210, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear facing camera, etc.).

In some implementations, EC 212 may be installed as a Trusted Execution Environment (TEE) component to the motherboard of IHS 200. Additionally, or alternatively, EC 212 may be further configured to calculate hashes or signatures that uniquely identify individual components of IHS 200. In such scenarios, EC 212 may calculate a hash value based on the configuration of a hardware and/or software component coupled to IHS 200. For instance, EC 212 may calculate a hash value based on all firmware and other code or settings stored in an onboard memory of a hardware component.

Hash values may be calculated as part of a trusted process of manufacturing IHS 200 and may be maintained in secure storage as a reference signature. EC 212 may later recalculate the hash value for a component may compare it against the reference hash value to determine if any modifications have been made to the component, thus indicating that the component has been compromised. As such, EC 212 may validate the integrity of hardware and software components installed in IHS 200.

In addition, EC 212 may provide an Out-of-Band communication channel that allows an Information Technology Decision Maker (ITDM) or Original Equipment Manufacturer (OEM) to manage IHS 200's various settings and configurations, for example, by issuing OOB commands.

In various embodiments, IHS 200 may be coupled to an external power source through an AC adapter, power brick, or the like. The AC adapter may be removably coupled to a battery charge controller to provide IHS 200 with a source of DC power provided by battery cells of a battery system in the form of a battery pack (e.g., a lithium ion or "Li-ion" battery pack, or a nickel metal hydride or "NiMH" battery pack including one or more rechargeable batteries).

Battery Management Unit (BMU) 213 may be coupled to EC 212 and it may include, for example, an Analog Front End (AFE), storage (e.g., non-volatile memory), and a microcontroller. In some cases, BMU 213 may be configured to collect and store information, and to provide that information to other IHS components.

Examples of information collectible by BMU 213 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information or state (e.g., such as ambient temperature, relative humidity, system geolocation measured by GPS or triangulation, time and date, etc.), events, etc.

Examples of events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, IHS 200 may not include all the components shown in FIG. 2. Furthermore, some components that are represented as separate components in FIG. 2 may instead be integrated with other components, such that all or a portion of the operations executed by the illustrated components may instead be executed by the integrated component.

For example, in various embodiments described herein, host processor(s) 201 and/or other components shown in FIG. 2 (e.g., chipset 202, display controller(s) 204, communication interface(s) 203, EC 212, etc.) may be replaced by other devices. As such, IHS 200 may assume different form factors including, but not limited to: servers, workstations, desktops, laptops, appliances, video game consoles, tablets, smartphones, etc.

It is important to enforce balanced access to a sensitive information by the users within an organization or enterprise. In a typical enterprise system, individual users are assigned to groups to manage system access. Often, individual groups belong to other groups thereby forming complex recursive hierarchies. Assigned roles in the enterprise contain certain permissions to access protected resources (which resources are typically accessed via APIs). The roles are associated with users or groups thereby granting the users or group-members access to the APIs. Like groups, roles may also be composed of other roles. In many organizations, the overall hierarchy might consist of thousands of users under hundreds of hierarchical groups associated to dozens of roles that grant corresponding permissions.

Throughout the lifecycle of an enterprise computer system, numerous operations may be performed on the users, groups, and roles. Any major operation on those entities- or even an accumulation of multiple minor operations—may result in overly permissive access to protected resources. Sometimes this overly permissive access can be granted unintentionally when one role is embedded within a chain of other roles or a particular group is linked to a chain of other groups.

Resources in the enterprise computer system may include, for example, one or more of a workload, an application, a file system, storage infrastructure, a memory device, a compute resource, a virtual machine, a network connection, a security module, a workstation, an IHS, an AI, and machine learning technology. These resources may be available locally, such as on a user workstation, or hosted in a cloud, such as in a data center. The resources may be accessed via an API and granting a user permission to use a particular API is equivalent to granting that user access to the related resource.

FIG. 3 illustrates a hierarchy of groups 301 and a hierarchy of roles 302 and their relationship within an enterprise. For example, groups G2 and G3 are immediately under group G1 and inherit all the access assigned to group G1. Groups G4 and G6 are hierarchically linked under group G3 so that group G4 inherits all the access assigned to group G3 (and its parent G1) and group G6 inherits access assigned to the entire parent chain G4, G3, and G1. Similarly, groups G5, G7, and G8 are hierarchically linked under group G3 and each inherits all the access assigned to the groups above it in the chain. So, group G8 has access permission for all resources assigned to groups G7, G5, G3 and G1.

Roles R2 and R3 are under role R1 and inherit the access permission assigned to role R1. Sub roles R4 and R5 under role R2 also inherit the access permission for role R1. Similarly, sub roles R6 and R7 under role R3 also inherit the access permission for role R1.

Group G5 and role R2 are linked together and inherit the access permission assigned to each other. However, they also inherit the chain of related access permissions above group G5 and role R2. So that when a user is assigned to group G8, for example, in addition to getting any access allowed specifically for group G8, the users also inherit all of the system access that is available to groups G7, G5, G3, and G1 and to roles R2 and R1.

An administrator can miss the fact that group G8 is located under groups G7 and G5 and that group G5 is associated with role R2, which is under role R1. Therefore, assigning users to group G8 will result in those users having major access to the system resources through group G5 and role R2. In other cases, the accumulated effect from multiple minor operations over a time can erode a system to a point where majority of the users have access to all the sensitive APIs within the system.

Accordingly, it is important to ensure that Identity and Access Management (IAM) operations do not result in too many users having access to too much sensitive information within the enterprise. Embodiments of the systems and methods disclosed here in are directed to enforcing a balanced users access to a sensitive information. The present system allows stakeholders to create an organization-wide baseline policy that will define maximum allowed percentages of users against corresponding ranges of the accessibility within the system. The baseline policy can then be consistently enforced resulting in balanced user access to the enterprise's sensitive information. Upon any future IAM operations, the system performs access calculations and rejects any problematic operation that would violate the boundaries defined by the baseline policy.

IAM systems include, for example, cloud-based solutions, such as Okta from Okta, Inc., that provides single sign-on (SSO), multi-factor authentication (MFA), and lifecycle management to manage user identities, groups, and roles across multiple applications and services. Alternatively, a cloud-based identity and access management service, such as Entra ID (formerly Azure Active Directory (Azure AD)) from Microsoft Corporation, can be used to integrate with on-premises AD and provide features like SSO, MFA, and conditional access. Cloud computing platforms may offer their own IAM services, such as AWS Identity and Access Management (AWS IAM) from Amazon Web Services, Inc, which manages users, groups, and roles for Amazon Web Services resources.

It is critical for system administrators to be able to enforce a baseline that dictates users' access within the system. Without a baseline that defines an upper percentage of users who can access a corresponding percentage of the system, there is a danger that numerous IAM operations will erode the system to a point that too many users have too access within the system. Such a situation increases the attack surface and puts the system at risk. It is possible to rely on the professionalism of system administrators who perform the IAM operations, but, as with any manual labor, this is risky and prone to human error.

A mechanism for enforcing a user access baseline defines degrees of access within the system, identifies which APIs and portions of code (i.e., resources) are more critical than others, and correlates roles/groups/users to access within the system. The system allows creation of an organization-wide baseline policy that will define the maximal allowed percentages of users against the corresponding ranges of the accessibility within the system. Then, when any IAM management operation occurs, the system calculates the new access percentages and reject any problematic operation that would violate the boundaries defined by the baseline policy.

The system uses a numeric metric referred to herein as Accessibility Weight (AW) that is associated with protected resources (e.g., exposed APIs). The AW metric reflects the criticality or sensitivity of the information exposed through a particular API. The amount of access that a user has in the system can be calculated based on the AW metric. Generally, the AW can be distributed uniformly among all the resource/APIs so that access to all APIs have the same weight or sensitivity. In some embodiments, the AW may be unevenly distributed amount the resources/APIs. Certain special resources may be associated with highly sensitive, confidential, or valuable information (e.g., personnel files, classified projects, applications requiring a subscription or license or per-use fee, etc.). Those special resources may be assigned a higher AW than normal to ensure or support restricted access.

Each user is associated with roles either directly or through the groups in which the user participates. Each role grants certain permissions, while each permission allows access to one more APIs that, in turn, have a certain AW. Therefore, it is possible to determine the percentage of access to sensitive information by any user through aggregation of the AWs determined from the chain: user→groups-→roles→permissions→protected resources (e.g., APIs) →Accessibility Weight.

The Total Accessibility Weight in the system is known and equals the aggregation of all the AWs in the system $$\left( \text{i.e., } AW_{Total} = \sum_{1}^{n} AW_n \right).$$

Therefore, the percentage of access by any user in the system can be calculated, and the percentage of access equals the amount of user access within the system divided by Total Accessibility Weight multiplied by 100.

The system defines a discrete function to serve as an access baseline within the entire organization:

$$F(LBA[p], UBA[p]) = U[p] \tag{1}$$

where LBA [p] is the lower bound percentage of the accessibility within the system, and UBA [p] is the upper bound percentage of the accessibility within the system. U [p] defines the percentage of users having access falling within the [LBA [p], UBA [p]] range. For example, F (90, 100)=1 means only 1% of system users have an accessibility level falling within the range between 90% and 100%.

The access baseline function allows for the definition of fine-grained access policies. Multiple ranges may be defined for the system. For example, a first range may define a percentage for users with all (i.e., system-wide) or nearly all access (e.g., in the range [90, 100]), while a second range defines a percentage for users with general system access (e.g., in the range [5, 90]). While the examples described herein refer to percentages of users, in other embodiments, specific numbers of users may be defined instead percentages of total users. For example, in another embodiment, the function F(90, 100)=10 could be defined to mean that no more than 10 individual system users can have an accessibility level falling within the range between 90% and 100%.

The endpoints of the defined range [LBA [p], UBA [p]] may be inclusive or exclusive depending on a system administrator selection. For example, the endpoints may be defined as inclusive unless otherwise overlapping with a higher range (e.g., range [90, 100] covers all of 90-100% access while related range [5, 90] covers 5% to <90% access).

Access enforcement is performed whenever an IAM operation occurs, such as a change of users, groups, roles, or permissions is attempted. An IAM system will function as an "accessibility enforcer" component within the system and will verify that the user percentages falling into each access range are less or equal than the U[p] value defined by the baseline function. If a proposed change will maintain the required percentages, then a requested action will be performed by the IAM system. If the proposed change will violate the access range value U[p], then the action will not be performed by the IAM system.

The IAM system may operate under a "strict" mode wherein any proposed action that would violate the baseline access range value U [p] will be rejected outright. Alternatively, the IAM system may operate under a "permissive" mode wherein the pre and post operation accessibility statistics will be provided so the user performing the action will be able to decide if he wants to proceed or cancel the operation.

Referring again to FIG. 3, an enterprise system administrator attempts to add a new group G9 with multiple users to group G8. However, group G8 is under groups G7 and G5 and group G5 is associated with role R2, which provides significant access within the system. Consider an example embodiment in which the baseline access policy is defined as F(90,100)=20% and F(5,90)=80%. This requires that no more than 20% of users can have access to between 90-100% of the system resources, and as many as 80% of users can have access to between 5-90% of the system resources. The current access levels in this example are F(90,100)=10% and F(5,90)=70%, which are within the baseline access policy limits. However, if group G9 is added under group G8, then the access levels will be F (90,100)=10% and F(5,90)=90%, which exceed the baseline access policy limits in the number of users with access to 5-90% of the system resources. These ranges are summarized in Table 1.

TABLE 1

| Baseline: | F(90, 100) = 20% | F(5, 90) = 80%. |
|---|---|---|
| Current: | F(90, 100) = 10% | F(5, 90) = 70%. |
| After proposed change (i.e., add G9 under G8): | F(90, 100) = 10% | F(5, 90) = 90%. |

The IAM system, such as an active directory component in the enterprise system, may function as an Accessibility Enforcer that stores the baseline policy, monitors the current access percentage, and calculates an expected new access percentage if the proposed provisioning were allowed (i.e., adding group G9 in this example). If the access percentage for the proposed provisioning is within the baseline policy, then the IAM system will perform the requested action. In this example, however, the access percentage exceeds a portion of the baseline policy (i.e., users within the 90-100% access range are within the policy, but users within the 5-90% access range exceed the policy). Therefore, the IAM system will not apply the requested action. Under a strict mode, the IAM system will outright reject the action. Under permissive mode, the IAM system will provide accessibility statistics (e.g., Table 1) to the system administrator requesting the action, who may direct the IAM system to either proceed (i.e., override the policy) or cancel the request.

FIG. 4 is flowchart 400 illustrating a method for enforcing balanced user access to sensitive information in an organization.

In step 401, an organization-wide baseline policy is defined. The policy specifies maximal allowed percentages of users against corresponding ranges of accessibility within the system. The organization-wide baseline policy serves as an access baseline within the organization, wherein the function specifies lower and upper bound percentages of accessibility and corresponding percentages of users having access within those ranges. In step 402, a numeric metric called Accessibility Weight (AW) is associated with protected resources. The AW metric reflects the criticality or sensitivity of the information exposed through each protected resource. In step 403, an amount of access for each user is calculated based on the AW metric by aggregating AWs from the chain: user, groups, roles, permissions, protected resources, and Accessibility Weight.

In step 404, a total accessibility weight for the system is determined by aggregating all the AWs in the system. In step 405, a percentage of access is calculated for each user by dividing the amount of user access by the total accessibility weight and multiplying by 100. In step 406, an identity and access management operation is initiated, wherein the operation includes changes to users, groups, roles, or permissions. The identity and access management operation may be a user provisioning action such as assigning a user to one or more groups, roles, permissions, or resources.

In step 407, an Accessibility Enforcer component, such as an IAM system, checks to determine whether user percentages falling into each access range are less than or equal to the values defined by the baseline policy. In step 408, the Accessibility Enforcer component enforces the baseline policy by (a) performing the identity and access management operation if the user percentages are within the defined ranges, or (b) rejecting the identity and access management operation if the user percentages exceed the defined ranges in a strict mode. If the identity and access management operation is rejected, then the Accessibility Enforcer component may provide pre- and post-operation accessibility statistics to a user so that the user can decide whether to proceed or cancel the operation.

According to one aspect of the present invention, a method for managing user access to information in a computer system comprises associating an Accessibility Weight (AW) with computer system resources; calculating an access amount for each user by aggregating AWs for each system resource available to the user; calculating a total accessibility weight in the system by aggregating the AWs for all of the system resources; calculating an access percentage for each user; identifying an access baseline for one or more access ranges in the computer system; and determining, by an identity and access management system, automatically when a user provisioning action is requested, whether the user provisioning action would violate the defined access baseline.

According to another aspect, the resources include one or more of: a workload, an application, a file system, storage infrastructure, a memory device, a compute resource, a virtual machine, a network connection, a security module, a workstation, an information handling system (IHS), an artificial intelligence (AI), and machine learning (ML) technology.

According to yet another aspect, the resources are accessed via an application programming interface (API).

According to another aspect, an AW value is based upon criticality or sensitivity of information exposed at a particular system resource.

According to yet another aspect, the identity and access management system determines whether the user provisioning action would violate the defined access baseline by determining a current level of access for the one or more access ranges in the computer system; determining an expected level of access for the one or more access ranges in the computer system that would occur if the user provisioning action is enacted; and determining whether the expected level of access exceeds the defined access baseline in one or more access ranges.

According to another aspect, if the user provisioning action would not violate the defined access baseline, then applying the user provisioning action; and if the user provisioning action would violate the defined access baseline, then automatically rejecting the user provisioning action.

According to yet another aspect, if the user provisioning action would not violate the defined access baseline, then applying the user provisioning action; and if the user provisioning action would violate the defined access baseline, then providing a user with a current level of access before the user provisioning action is enacted and an expected level of access if the user provisioning action is enacted; and prompting the user to select whether to enact or reject the user provisioning action.

According to another aspect, the identity and access management system is configured to function as an Accessibility Enforcer component by evaluating whether user percentages falling into each access range are less than or equal to the access baseline.

According to yet another aspect, the access baseline specifies maximal allowed percentages of users against ranges of accessibility within the computer system.

According to another aspect, the AW for each resource corresponds to an importance of information exposed through the resource.

According to yet another aspect, the user provisioning action comprises assigning a user to one or more groups, roles, permissions, or resources.

According to another aspect, the access baseline defines lower and upper bound percentages of resource accessibility within the computer system across one or more access ranges.

According to yet another aspect, the access percentage for each user is based upon the access amount for each user and the total accessibility weight in the system.

According to another aspect of the present invention, a system for enforcing balanced user access to sensitive information comprises an identity and access management (IAM) system configured to manage access to a computer system; a user interface configured to provision computer system users via the IAM system; and an accessibility enforcement system comprising a non-transitory computer-readable medium storing instructions that, when executed by one or more processors, cause the accessibility enforcement system to perform the actions comprising identifying a baseline access policy that specifies maximal allowed percentages of users against corresponding ranges of accessibility within the system; associating an accessibility weight with computer system resources, wherein the accessibility weight reflects the criticality or sensitivity of the information exposed through each resource; calculating an access amount for each user based on the accessibility weight metric by aggregating accessibility weights from the groups and roles assigned to the user; determining a total accessibility weight in the system by aggregating all the accessibility weights in the system; calculating an access percentage for each user; and provisioning new groups or roles to a user if the user percentages in each range are less than or equal to the values defined by the baseline access policy.

According to yet another aspect, the instructions further cause the accessibility enforcement system to perform the actions rejecting a request to provision a new user if the user percentages in any range exceed the values defined by the baseline access policy.

According to another aspect, the instructions further cause the accessibility enforcement system to perform the actions providing pre and post-provisioning accessibility statistics to allow a user to decide whether to provision a new user if the user percentages in any range exceed the values defined by the baseline access policy.

According to yet another aspect, the resources include one or more of: a workload, an application, a file system, storage infrastructure, a memory device, a compute resource, a virtual machine, a network connection, a security module, a workstation, an information handling system (IHS), an artificial intelligence (AI), and machine learning (ML) technology.

According to another aspect, the resources are accessed via an application programming interface (API).

According to yet another aspect, the baseline access policy defines lower and upper bound percentages of resource accessibility within the computer system across one or more access ranges.

According to another aspect, the access percentage for each user is based upon the access amount for each user and the total accessibility weight in the system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for managing user access to information in a computer system, comprising:

associating an Accessibility Weight (AW) with each of a plurality of computer system resources, wherein each AW corresponds to a criticality of information exposed through the associated computer system resource;

calculating an access amount for each user by aggregating AWs for each of the plurality of computer system resource available to the user;

calculating a total accessibility weight in the system by aggregating the AWs for all of the plurality of computer system resources;

calculating an access percentage for each user based on the access amount for the respective user and the total accessibility weight in the system;

identifying an access baseline for one or more access ranges in the computer system based on the access percentages for each user; and determining, by an identity and access management system, automatically when a user provisioning action is requested, whether the user provisioning action would violate the defined access baseline.

2. The method of claim 1, wherein the resources include one or more of: a workload, an application, a file system, storage infrastructure, a memory device, a compute resource, a virtual machine, a network connection, a security module, a workstation, an information handling system (IHS), an artificial intelligence (AI), and machine learning (ML) technology.

3. The method of claim 1, wherein the resources are accessed via an application programming interface (API).

4. The method of claim 1, wherein the identity and access management system determines whether the user provisioning action would violate the defined access baseline by:

determining a current level of access for the one or more access ranges in the computer system;

determining an expected level of access for the one or more access ranges in the computer system that would occur if the user provisioning action is enacted; and determining whether the expected level of access exceeds the defined access baseline in one or more access ranges.

5. The method of claim 4, further comprising:

if the user provisioning action would not violate the defined access baseline, then applying the user provisioning action; and if the user provisioning action would violate the defined access baseline, then automatically rejecting the user provisioning action.

6. The method of claim 4, further comprising:

if the user provisioning action would not violate the defined access baseline, then applying the user provisioning action; and if the user provisioning action would violate the defined access baseline, then:

providing a user with a current level of access before the user provisioning action is enacted and an expected level of access if the user provisioning action is enacted; and prompting the user to select whether to enact or reject the user provisioning action.

7. The method of claim 1, wherein the identity and access management system is configured to function as an Accessibility Enforcer component by evaluating whether user percentages falling into each access range are less than or equal to the access baseline.

8. The method of claim 1, wherein the access baseline specifies maximal allowed percentages of users against ranges of accessibility within the computer system.

9. The method of claim 1, wherein the AW for each resource corresponds to an importance of information exposed through the resource.

10. The method of claim 1, wherein the user provisioning action comprises assigning a user to one or more groups, roles, permissions, or resources.

11. The method of claim 1, wherein the access baseline defines lower and upper bound percentages of resource accessibility within the computer system across one or more access ranges.

12. The method of claim 1, wherein the access percentage for each user is based upon the access amount for each user and the total accessibility weight in the system.

13. A system for enforcing balanced user access to sensitive information, comprising:

an identity and access management (IAM) system configured to manage access to a computer system;

a user interface configured to provision computer system users via the IAM system; and an accessibility enforcement system comprising a nontransitory computer-readable medium storing instructions that, when executed by one or more processors, cause the accessibility enforcement system to perform the actions comprising:

identifying a baseline access policy that specifies maximal allowed percentages of users against corresponding ranges of accessibility within the system;

associating an accessibility weight with each of a plurality of computer system resources, wherein the accessibility weight reflects the criticality or sensitivity of the information exposed through each associated resource;

calculating an access amount for each user based on the accessibility weight metric by aggregating accessibility weights from the groups and roles assigned to the user;

determining a total accessibility weight in the system by aggregating all the accessibility weights in the system;

calculating an access percentage for each user based on the access amount for the respective user and the total accessibility weight in the system; and provisioning new groups or roles to a user if the user percentages in each range are less than or equal to the values defined by the baseline access policy.

14. The system of claim 13, wherein the instructions further cause the accessibility enforcement system to perform the actions:

rejecting a request to provision a new user if the user percentages in any range exceed the values defined by the baseline access policy.

15. The system of claim 13, wherein the instructions further cause the accessibility enforcement system to perform the actions:

providing pre and post-provisioning accessibility statistics to allow a user to decide whether to provision a new user if the user percentages in any range exceed the values defined by the baseline access policy.

16. The system of claim 13, wherein the resources include one or more of: a workload, an application, a file system, storage infrastructure, a memory device, a compute resource, a virtual machine, a network connection, a security module, a workstation, an information handling system (IHS), an artificial intelligence (AI), and machine learning (ML) technology.

17. The system of claim 13, wherein the resources are accessed via an application programming interface (API).

18. The system of claim 13, wherein the baseline access policy defines lower and upper bound percentages of resource accessibility within the computer system across one or more access ranges.

19. The system of claim 13, wherein the access percentage for each user is based upon the access amount for each user and the total accessibility weight in the system.

* * * * *